United States Patent
Ferte et al.

(10) Patent No.: US 7,438,530 B2
(45) Date of Patent: Oct. 21, 2008

(54) METHOD OF ASSEMBLING ONE-PIECE BLADED DISKS, AND A DEVICE FOR DAMPING VIBRATION OF THE BLADES OF SUCH DISKS

(75) Inventors: Jean-Pierre Ferte, Corbeil-Essonnes (FR); Marc Jacky Vassault, Evry (FR); Didier Brouard, Nandy (FR)

(73) Assignee: SNECMA, Paris (FR)

( * ) Notice: Subject to any disclaimer, the term of this patent is extended or adjusted under 35 U.S.C. 154(b) by 475 days.

(21) Appl. No.: 11/129,437

(22) Filed: May 16, 2005

(65) Prior Publication Data

US 2006/0051211 A1     Mar. 9, 2006

(30) Foreign Application Priority Data

Apr. 17, 2004   (FR)   .................................... 04 05329

(51) Int. Cl.
*F01D 5/30* (2006.01)
(52) U.S. Cl. .............................. 416/198 A; 416/201 R; 416/213 R; 416/244 R; 29/889.2
(58) Field of Classification Search ............. 416/201 R, 416/198 A, 244 R, 244 A, 213 R; 29/889.2, 29/889.21, 889.22
See application file for complete search history.

(56) References Cited

U.S. PATENT DOCUMENTS

| 4,033,501 | A | * | 7/1977 | Ambrose et al. | ............. 228/2.3 |
| 4,483,054 | A | * | 11/1984 | Ledwith | .................... 29/889.2 |
| 4,743,165 | A | * | 5/1988 | Ulrich | .................... 416/198 A |
| 5,486,262 | A | | 1/1996 | Searle | |
| 5,551,623 | A | | 9/1996 | Collot et al. | |
| 7,128,535 | B2 | * | 10/2006 | Sucin et al. | ............. 416/198 A |

FOREIGN PATENT DOCUMENTS

FR     2 848 132     6/2004
GB     2 255 138 A   10/1992

* cited by examiner

*Primary Examiner*—Igor Kershteyn
(74) *Attorney, Agent, or Firm*—Oblon, Spivak, McClelland, Maier & Neustadt, P.C.

(57) ABSTRACT

A method of assembling together one-piece bladed disks by friction welding, and a damper device for damping vibration of the blades of the disks. The damper device includes annular linings for covering the blades and filling the gaps between the blades, the linings being made of elastomer and being held and clamped when mounted on the blades.

20 Claims, 4 Drawing Sheets

METHOD OF ASSEMBLING ONE-PIECE BLADED DISKS, AND A DEVICE FOR DAMPING VIBRATION OF THE BLADES OF SUCH DISKS

The present invention relates to a method of assembling one-piece bladed disks, and to a device for damping vibration of the blades of the disks while they are being assembled.

BACKGROUND OF THE INVENTION

Two types of bladed disks are known, one in which the blades are engaged in peripheral grooves in the disks, and another in which the disks are made integrally with the blades which are machined at the periphery of the disks (with disks of this type being referred to as one-piece bladed disks).

One-piece bladed disks are being used increasingly in the high pressure and low pressure compressors of turbojets, in order to reduce weight.

The various stages of disks can be assembled together axially by bolting, by electron beam welding, or, in particular when the disks are made of nickel alloy, by inertial or driven friction welding.

Friction welding consists in pressing a disk that is prevented from rotating hard against another disk that is rotating about its axis and that is prevented from moving in translation. The friction between the contacting faces of the disks gives off a large quantity of heat which raises the temperature of these faces that are in contact and enables them to be assembled together by welding.

Nevertheless, that assembly technique leads to intense levels of vibration and can cause the blades of one-piece bladed disks to be set into resonance, which can lead to them being destroyed by cracking due to vibratory fatigue.

As a result, friction welding is thus used only with disks having blades that are mechanically attached thereto subsequently, i.e. disks that present peripheral grooves for receiving and retaining the roots of blades.

One solution might be to assemble together one-piece bladed disks by friction welding before the blades have been machined so as to enable them to withstand vibration better, and then to machine the blades after the operation of welding the disks together. However that solution would be very expensive and risky, in particular because of the difficulties of using special tooling for machining blades between disks that have been assembled together.

OBJECTS AND SUMMARY OF THE INVENTION

A particular object of the invention is to provide a solution to these problems that is simple, effective, and inexpensive.

To this end, the invention provides a method of assembling one-piece bladed disks, which method consists in mounting vibration damper means on and between the blades of the disks, and then in welding the disks together by friction.

The invention makes it possible to assemble together one-piece bladed disks by friction welding because of the damper means that are mounted on and between the blades, thereby preventing them from entering into resonance during the friction welding.

The method of the invention also consists in mounting additional vibration damper means between the damper means mounted on the blades of the disks and the portion of the welding machine that faces the damper means mounted on the blades.

This makes it possible also to maximize damping of vibration in the assembly formed by the blades and their damper means, in particular for blades of large size.

Advantageously, these additional damper means are constituted by blocks of elastomer clamped between said portion of the welding machine and the damper means mounted on the blades.

The invention of the method is particularly intended for assembling together one-piece bladed disks whose blades have already been machined, nevertheless, it can also be applied to assembling together disks having blades that have been machined in part only or that have not yet been machined.

The invention also provides a damper device for damping vibration of the blades of a one-piece bladed disk, the device being designed to be mounted on the blades of the disk to damp vibration of said blades while the disk is being assembled to another disk by friction welding, and the device comprising covering and filler means for covering the blades and filling the gaps between the blades, said means being made of an elastically deformable material, and holding and clamping means for holding and clamping the covering and filler means when mounted on the blades.

In a preferred embodiment of the invention, the covering and filler means comprise annular linings for engaging on the convex and the concave faces respectively of the blades. The surfaces of the annular linings that are to come into contact with the blades are preferably shaped to be complementary to the shape of the blades. By way of example, the covering means may comprise a first annular lining for pressing against the upstream faces of the blades and of the disks, and a second annular lining for pressing against the downstream faces of the blades and of the disks, the facing faces of the two linings being of shapes that are complementary to the shape of the blades and are substantially complementary to each other. The linings may advantageously be made in molds manufactured by stereolithography on the basis of digital files numerically specifying the shapes of the blades.

Advantageously, each annular lining is made up of a plurality of elements for being placed circumferentially end to end.

This makes it easier to mount the annular linings on the blades or on the holding and clamping means of the linings. The linings are made of a suitable elastomer, such as silicone or polyurethane.

The holding and clamping means of the linings comprise two annuluses of rigid material each having a radial annular face for pressing and supporting an annular lining, and a peripheral rim provided with means for clamping the linings axially against the blades of the disk. The axial clamping means may be constituted, for example, by bolts or screws.

This device has the advantage of being simple to make and to put into place, and of comprising a small number of parts.

Preferably, the device also comprises means for centering and positioning linings on the annuluses, e.g. studs projecting from the linings and received in corresponding cavities or orifices in the annuluses.

The linings advantageously have radially inner annular rims for being pressed and clamped by the annuluses against a peripheral ring of the disk on which the blades are formed. Each annulus is advantageously made of two semicircular elements that are releasably and separably assembled together, e.g. by bolting.

Adjustment spacers may be placed between the annuluses to determine the degree to which the linings are clamped by the annuluses. In a variant, it is possible to use a torque wrench for obtaining an equivalent result.

In general, the device of the invention presents the following advantages:

it protects the blades against any risk of damage during friction welding;

it can be reused freely, the linings or the lining elements being easy to replace if they become worn;

it is simple and easy to implement;

it is easy to disassemble;

it occupies little space in the axial direction and it does not interfere with the friction welding of the disks; and it can be used equally well on a disk that is "stationary" and on a disk that is "moving" during friction welding.

BRIEF DESCRIPTION OF THE DRAWINGS

Other advantages and characteristics of the invention appear on reading the following description made by way of non-limiting example and with reference to the accompanying drawings, in which.

MORE DETAILED DESCRIPTION

Figure 1:
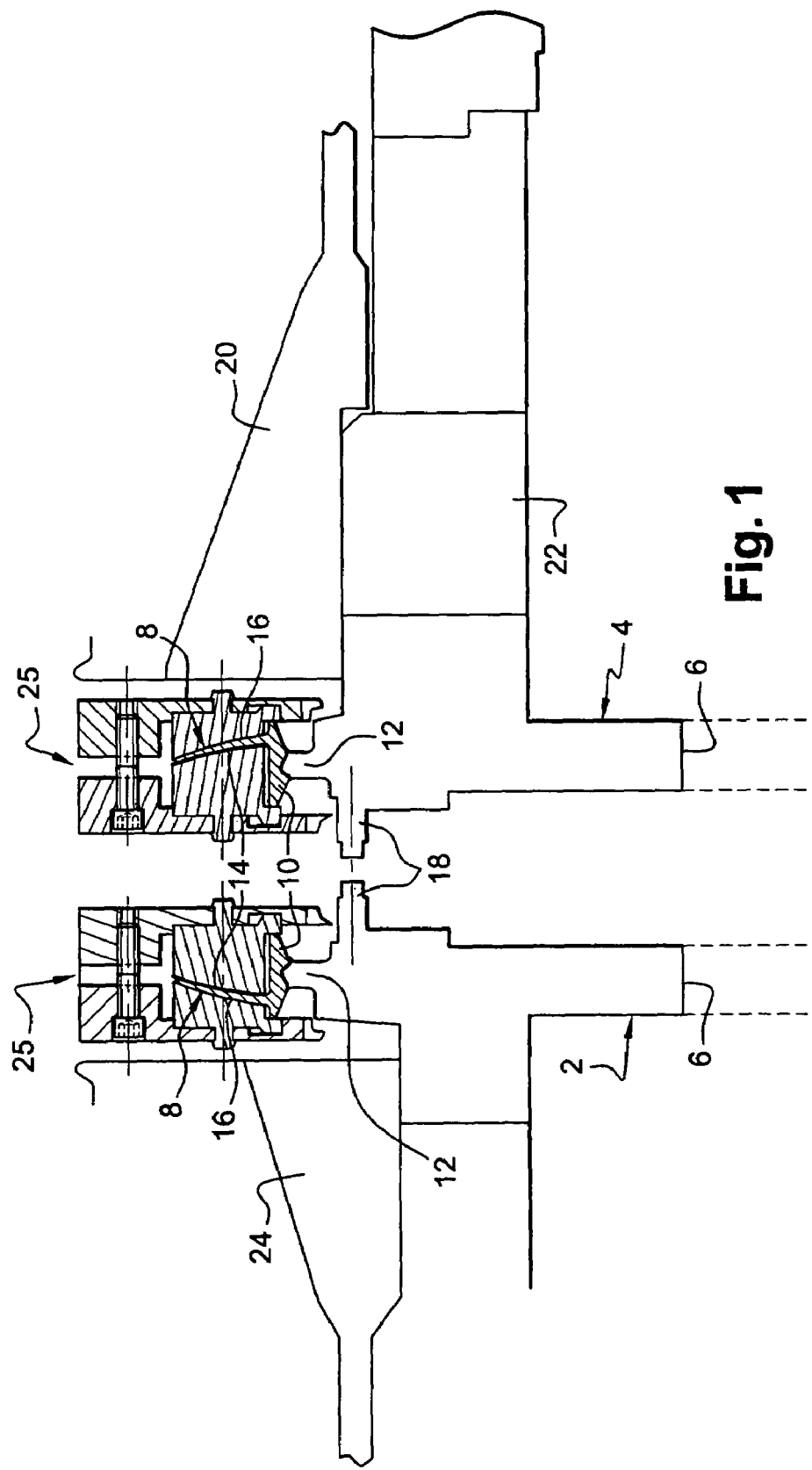
FIG. 1 is a diagrammatic axial half-view of two one-piece bladed disks mounted on a friction welding machine.

Reference is made initially to FIG. 1 which is a diagram showing the essential elements of a machine for friction welding two one-piece bladed disks 2, 4 on a common axis.

Each one-piece bladed disk 2, 4 presents a bore 6 and carries blades 8 on its outer periphery, which blades are integral with the disks 2, 4 and have been machined on the periphery of the disk. In conventional manner, the blades 8 extend obliquely relative to the axis of the disk 2, 4 on a cylindrical ring 10 secured by a narrow annular base 12 to the outer periphery of the disk 2, 4. Each blade 8 has a concave inside surface 14 and a convex outside surface 16.

In the vicinity of its outer periphery, each disk 2, 4 also has a cylindrical rib 18 which is to be used for assembling it by friction welding to the cylindrical rib 18 of another one-piece bladed disk, the rib 18 being located on the side of the disk 2, 4 where welding is to be performed.

For friction welding purposes, a first disk 2 is clamped in the jaws 24 of the welding machine and bears axially against abutments of the welding machine, said disk 2 being rotatable about the axis of the disk 2, 4 and being prevented from moving in axial translation.

The other disk 4 is clamped in jaws 20 and bears axially against abutments 22 of the welding machine, this disk 4 being prevented from rotating but being movable in axial translation towards the disk 2 that is rotatable until the facing faces of the above-mentioned ribs 18 rub against each other so as to be welded together.

Friction welding may be of the inertial type or of the driven type, depending on whether the disk 2 is caused to rotate during friction welding by its own inertia, or by drive means.

Friction welding generates intense vibration in the blades 8 of the one-piece bladed disks 2, 4. An object of the invention is to ensure that the blades 8 are not damaged by mounting suitable damper means 25 on the blades of the disks 2, 4.

Figure 2:
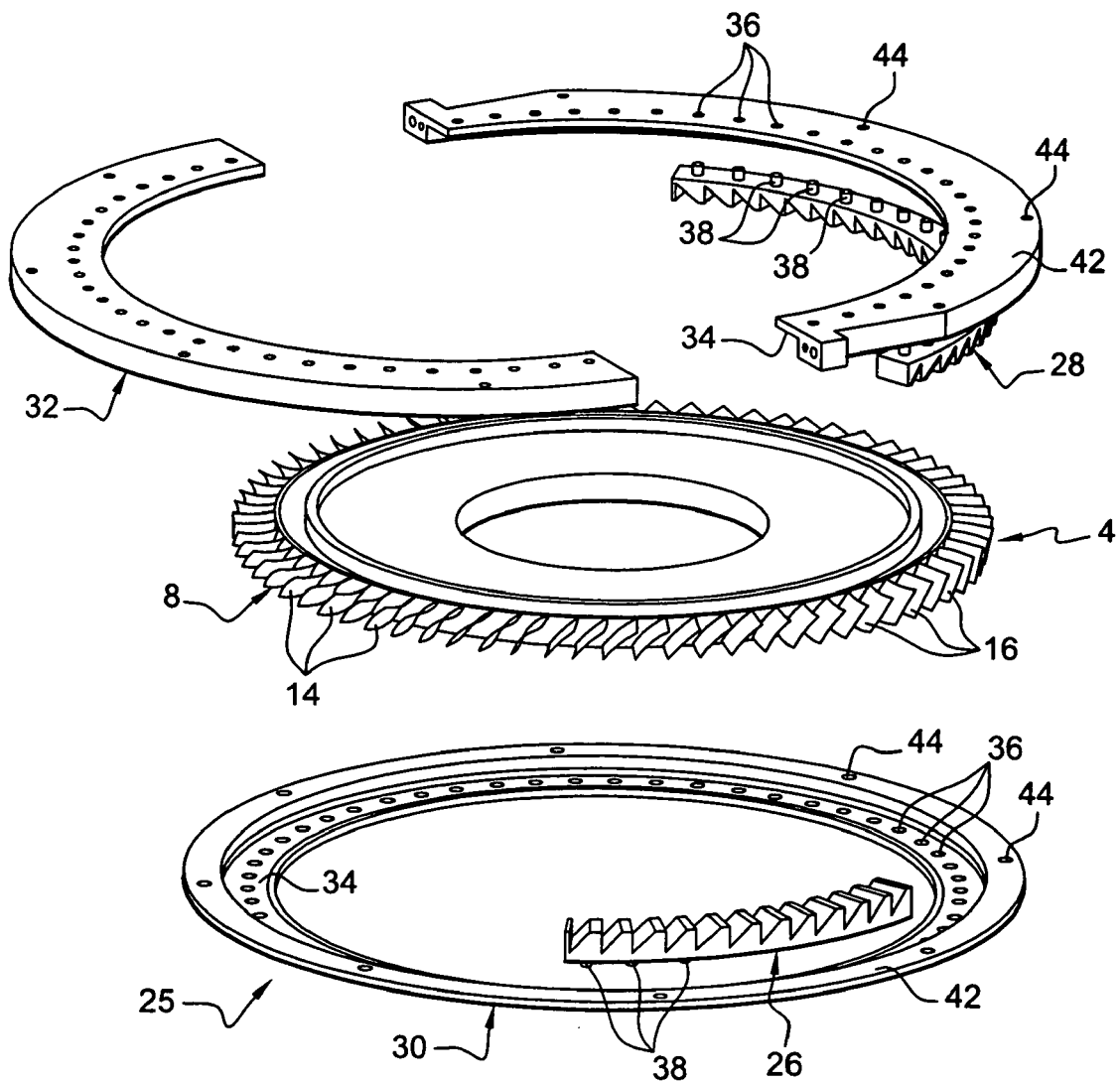
FIG. 2 is a diagrammatic exploded perspective view of a disk and the associated damper means.
Figure 3:
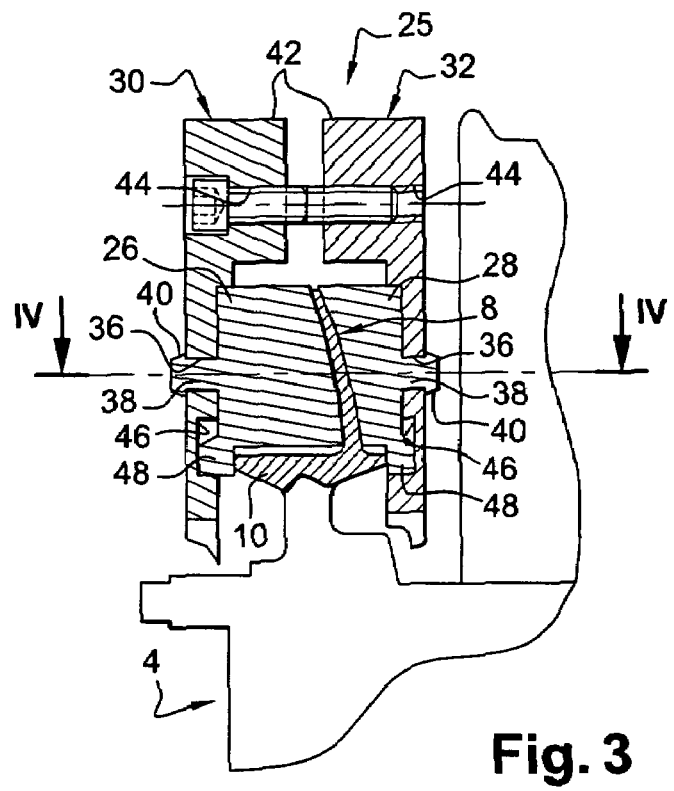
FIG. 3 is a fragmentary axial section view on a larger scale showing a disk and its damper means.
Figure 4:
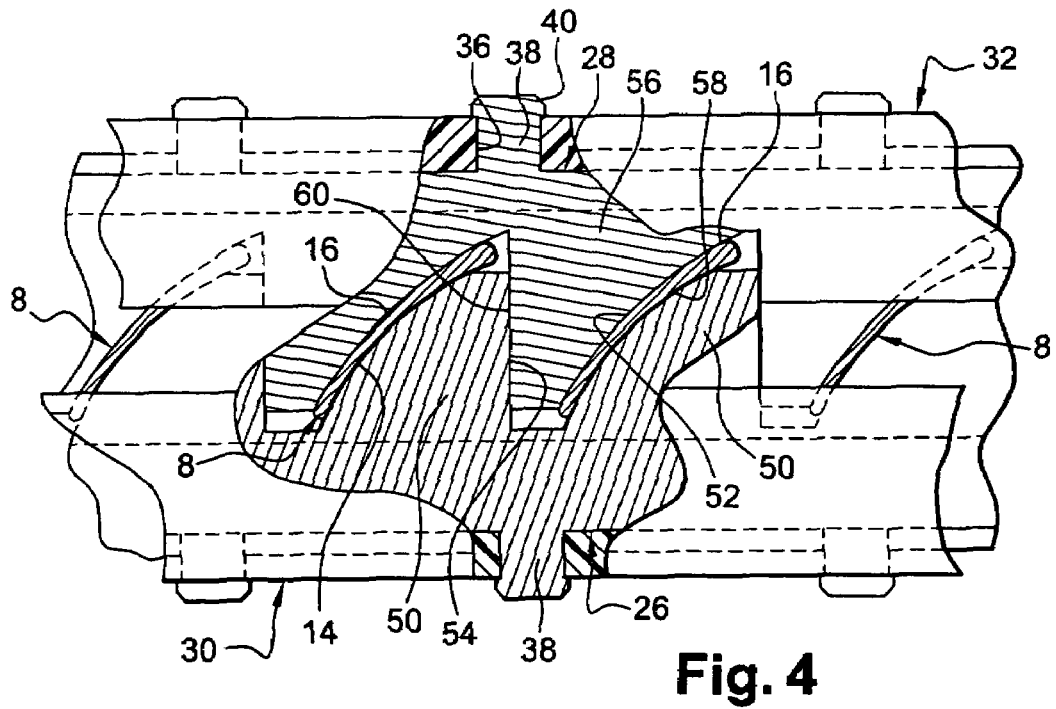
FIG. 4 is a plan view, partially in section on line IV-IV of FIG. 3.

In the embodiment shown in FIGS. 2 to 4, these damper means 25 comprise annular linings 26, 28 covering the blades 8 and filling the gaps between the blades 8.

A first annular lining 26, shown in part, is designed to be engaged without clearance against the concave faces 14 of the blades 8, and a second annular lining 28, shown in part, is designed to be engaged without clearance against the convex faces 16 of the blades 8. The surfaces of the linings 26, 28 that come into contact with the blades 8 are of a shape that is substantially complementary to the concave and convex faces 14 and 16 respectively, as described in greater detail below with reference to FIG. 4.

The linings 26 and 28 are made up of a plurality of elements for placing substantially end to end around a circumference. They are made of an elastically deformable material such as silicone or polyurethane, and they serve to damp vibration of the blades 8 during friction welding.

The linings 26, 28 are held and clamped against the blades 8 by two annuluses 30, 32 mounted on either side of the disk 4, and each having a radial annular face 34 for bearing against and supporting the above-specified linings 26, 28.

The annuluses 30, 32 are preferably each constituted by two semicircular elements that are assembled together by suitable means, e.g. by bolting. The annuluses 30 and 32 include cavities or orifices 36 in substantially middle portions of their radial faces 34 for the purpose of receiving studs 38 projecting from the surfaces of the linings 26, 28 facing away from the blades 8 of the disk 4.

The studs 38 and the associated cavities 36 serve to center and position the linings 26, 28 or the lining elements on the annuluses 30, 32. The studs 38 are of axial length that is greater than the thickness of the annuluses 30, 32 in their radial faces 34, and carry outwardly-directed annular rims 40 at their free ends that project from the faces of the corresponding annulus 30, 32 that face away from the blades, thus enabling the linings 26, 28 or the lining elements to be held against the annuluses 30, 32 while the damper means 25 are being assembled on the blades 8.

Each annulus 30, 32 also has a cylindrical rim 42 facing towards the other annulus 32, 30 and located at its radially outer periphery situated around the blades 8, and these rims 42 present orifices 44 for passing means for clamping the linings 26, 28 axially against the blades 8 of the disk, e.g. screws or bolts.

The degree with which the linings 26, 28 are clamped by the annulus 30, 32 needs to be optimized in order to ensure good damping of the vibration of the blades 8. For this purpose, it is possible to place adjustment spacers of predetermined thickness between the facing faces of the rims 42 of the annuluses 30, 32, or else to use a torque wrench when tightening the above-mentioned means for clamping the linings 26, 28.

The annuluses 30, 32 also have respective annular grooves 46 in the radially inner portions of their radial faces 34 for receiving radially inner edges 48 projecting from the linings 26, 28, the edges 48 of the linings being designed to be pressed and clamped against the above-mentioned peripheral ring 10 of the disk 4 by the annuluses 30, 32 and the associated clamping means.

FIG. 4 is a plan view partially in section on lines IV-IV of FIG. 3 and shows the shape of the surfaces of the linings 26, 28 that come into contact with the blades 8. The linings 26, 28 or the lining elements may advantageously be made in molds that are produced by stereolithography on the basis of digital files numerically specifying the shapes of the blades 8.

The lining 26 for engaging against the concave faces 14 of the blades 8 has sawtooth portions 50 that are regularly distributed angularly, each presenting a convex face 52 for pressing against the concave face 14 of a blade 8, and a radial face 54 which extends between two blades 8. The distance between two successive portions 50 is substantially equal to the distance between two successive blades 8.

The lining 28 for engaging against the convex faces 16 of the blades 8 has sawtooth portions 56 that are regularly distributed angularly, each presenting a concave face 58 for pressing against a convex face 16 of a blade 8, and a radial face 60 for pressing against the above-mentioned radial face 54 of a portion 50 of said other lining 26.

The portions 50, 56 of the linings 26, 28 engage in one another and on the blades 8 substantially without clearance, except at the ends of the sawteeth formed by the portions 50 and 56, so that the linings 26 and 28 can be clamped against the blades 8 without compression of their constituent material opposing such clamping.

Figure 5:
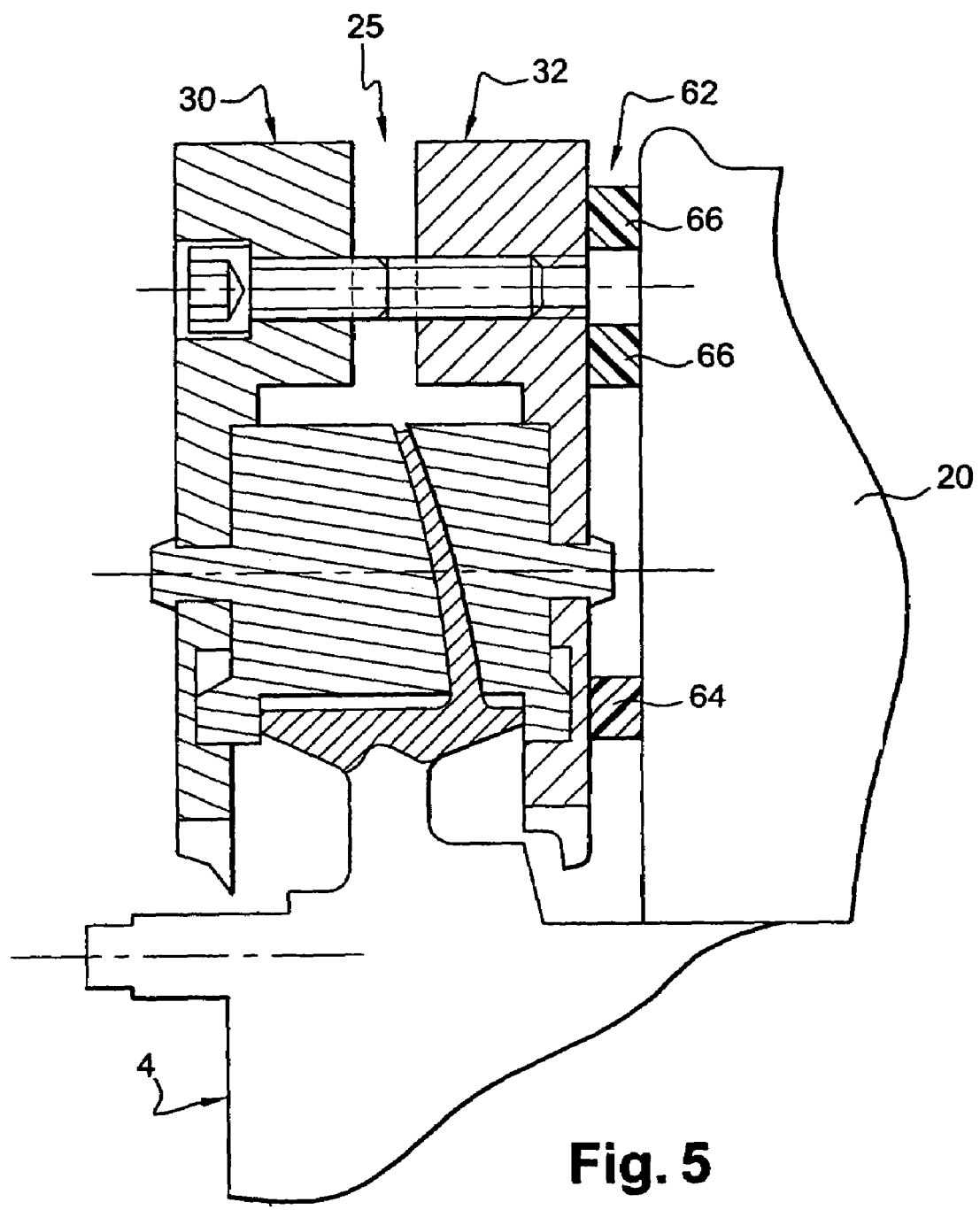
FIG. 5 is a view corresponding to FIG. 3 and showing additional damper means.

FIG. 5 shows additional damper means 62 disposed between the annulus 32 of the disk 4 and a radial face of the jaw 20 of the welding machine. Damper means may also be placed between the annulus 32 of the disk 2 and a corresponding radial face of the jaw 24 of the welding machine.

These additional damper means 62 are used in particular with blades of large size in which the amplitude of vibration is greater at their outer ends that is the case with small blades.

These means 62 comprise elastomer blocks that can be of differing hardnesses and that are mounted in prestressed manner between the annuluses 30, 32 and the jaws 24, 20 of the welding machine. It is preferable to place blocks 64 of smaller hardness against the radially inner portions of the annuluses, and blocks 66 of greater hardness against the radially outer portions of the annuluses. Typically, the elastomer used for making the linings 26, 28 and the blocks 64, 66 have hardness lying in the range 40 to 50 on the Shore A scale, for example.

What is claimed is:

1. A method of assembling together one-piece bladed disks, the method comprising:
   mounting a vibration damper means on and between blades of the disks, and
   welding the disks together by friction welding.

2. A method according to claim 1, further comprising machining the blades of the disks before welding the disks together by friction welding.

3. A method according to claim 1, further comprising mounting an additional vibration damper means between the damper means mounted on the blades of a disk during friction welding and a portion of a welding machine that faces said vibration damper means mounted on the blades.

4. A method according to claim 3, wherein the additional damper means includes elastomer blocks clamped between said portion of the welding machine and the vibration damper means mounted on the blades.

5. A device for damping vibration of blades of a one-piece bladed disk, the device being designed to be mounted on the blades of the disk to damp vibration of said blades while the disk is being assembled to another disk by friction welding, the device comprising covering and filler means for covering the blades and filling the gaps between the blades, said "means for covering the blades and filling the gaps between the blades", being made of an elastically deformable material, and means for holding and clamping the covering and filler means a holding and clamping device configured to hold and clamp said cover and filler mounted on the blades.

6. A device according to claim 5, wherein the covering and filler means comprise annular linings designed to be engaged on concave faces and the convex faces, respectively, of the blades.

7. A device according to claim 6, wherein surfaces of the annular linings that are designed to come into contact with the blades are of shapes that are complementary to shapes of the blades.

8. A device according to claim 7, wherein the linings are made in molds fabricated by stereolithography from digital files numerically specifying the shapes of the blades.

9. A device according to claim 6, including an annular lining for pressing against upstream faces of the blades and of the disk, and an annular lining for pressing against downstream faces of the blades and of the disk, facing faces of the linings being of shapes that are complementary to shapes of the blades and being substantially complementary to each other.

10. A device according to claim 6, wherein each annular lining is made up of a plurality of elements designed to be placed end to end around a circumference.

11. A device according to claim 6, wherein the linings are made of elastomer.

12. A device according to claim 11, wherein the linings are made of silicone or of polyurethane.

13. A device according to claim 6, wherein the means for holding and clamping the linings comprise two annuluses of rigid material, each having a radial annular face for pressing against and supporting one of the annular linings and a peripheral rim provided with axial clamping means for axially clamping the linings against the blades of the disk.

14. A device according to claim 13, wherein the axial clamping means comprise screws or bolts.

15. A device according to claim 13, including means for centering and positioning the linings on the annuluses.

16. A device according to claim 15, wherein the means for centering and positioning the linings on the annuluses comprise studs formed to project from the linings and received in corresponding cavities or orifices of the annuluses.

17. A device according to claim 13, wherein each annulus is made of two semicircular elements that are assembled together in releasable and separable manner.

18. A device according to claim 13, including adjustment spacers for placing between the annuluses to determine the degree to which the linings are clamped axially by the annuluses.

19. A device according to claim 13, wherein the linings have radially inner annular rims for being pressed and clamped by the annuluses against a peripheral ring of the disk on which the blades are formed.

20. A device according to claim 5, wherein the one-piece bladed disk is a disk of a turbojet compressor.

\* \* \* \* \*